United States Patent
Homma et al.

(10) Patent No.: US 9,658,761 B2
(45) Date of Patent: May 23, 2017

(54) INFORMATION PROCESSING APPARATUS, INFORMATION PROCESSING METHOD, AND COMPUTER PROGRAM

(75) Inventors: Fuminori Homma, Tokyo (JP); Ikuo Yamano, Tokyo (JP); Shunichi Kasahara, Kanagawa (JP); Tatsushi Nashida, Kanagawa (JP)

(73) Assignee: Sony Corporation, Tokyo (JP)

( * ) Notice: Subject to any disclaimer, the term of this patent is extended or adjusted under 35 U.S.C. 154(b) by 783 days.

(21) Appl. No.: 13/474,869

(22) Filed: May 18, 2012

(65) Prior Publication Data

US 2012/0304199 A1    Nov. 29, 2012

(30) Foreign Application Priority Data

May 27, 2011   (JP) .................................. 2011-118573

(51) Int. Cl.
*G06F 3/041* (2006.01)
*G06F 3/0488* (2013.01)
*G06F 9/44* (2006.01)

(52) U.S. Cl.
CPC .......... *G06F 3/0488* (2013.01); *G06F 9/4443* (2013.01)

(58) Field of Classification Search
CPC . G06F 3/04817; G06F 3/0482; G06F 3/04845
USPC .................. 345/173–174; 715/244, 702, 863
See application file for complete search history.

(56) References Cited

U.S. PATENT DOCUMENTS

| | | | |
|---|---|---|---|
| 2009/0207144 A1* | 8/2009 | Bridger | 345/173 |
| 2010/0060591 A1* | 3/2010 | Yousefpor et al. | 345/173 |
| 2010/0162109 A1* | 6/2010 | Chatterjee et al. | 715/702 |
| 2010/0169766 A1* | 7/2010 | Duarte et al. | 715/244 |
| 2010/0211920 A1* | 8/2010 | Westerman et al. | 715/863 |
| 2010/0214250 A1* | 8/2010 | Gillespie et al. | 345/173 |

FOREIGN PATENT DOCUMENTS

JP    2008-117371    5/2008

* cited by examiner

*Primary Examiner* — Calvin C Ma
(74) *Attorney, Agent, or Firm* — Paratus Law Group, PLLC

(57) ABSTRACT

Provided is an information processing apparatus including an event processing unit for performing in a background a process corresponding to an operation input that is estimated based on a state of an operating tool in a first state, and for performing, when the operating tool in the first state enters a second state, a feedback process for the operation input using the process performed in the background.

11 Claims, 16 Drawing Sheets

FIG.1
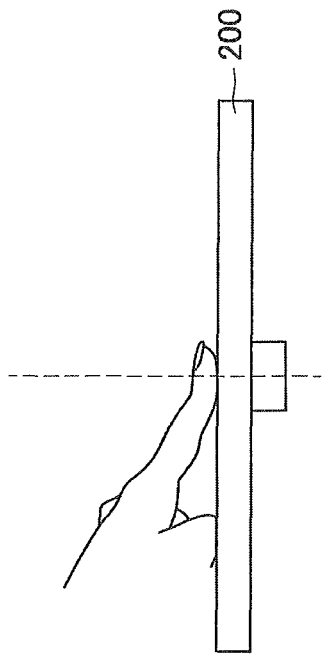
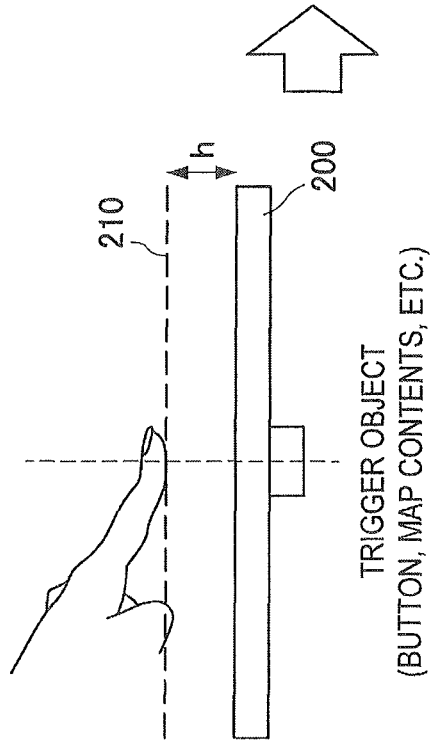

FIG.6
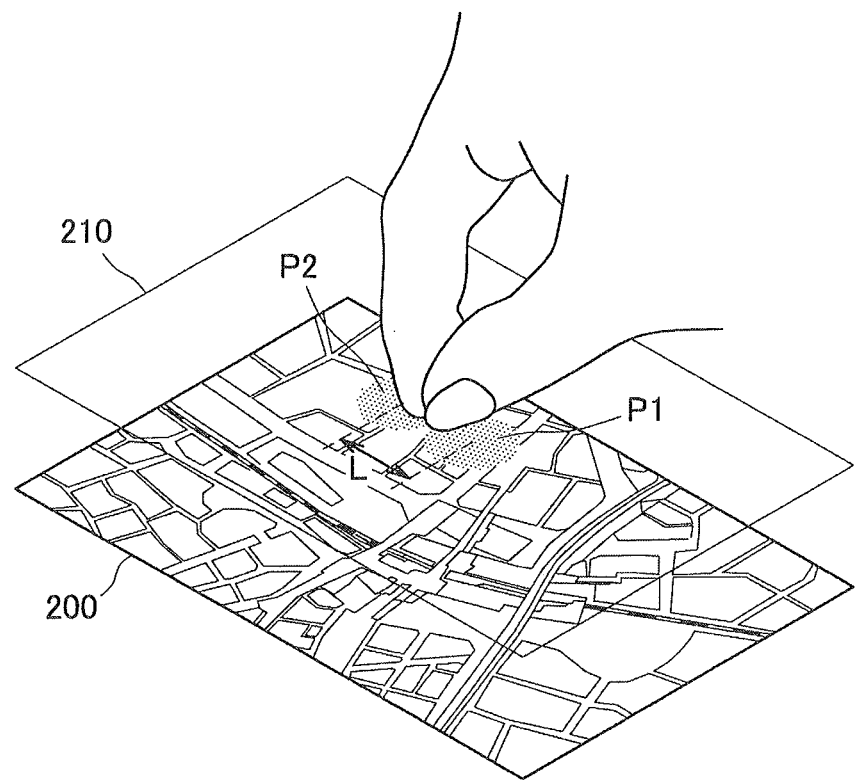
HOVERING FINGERS: TWO, ADJACENT
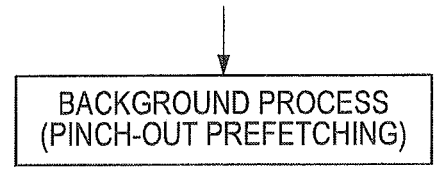
BACKGROUND PROCESS
(PINCH-OUT PREFETCHING)

FIG.7
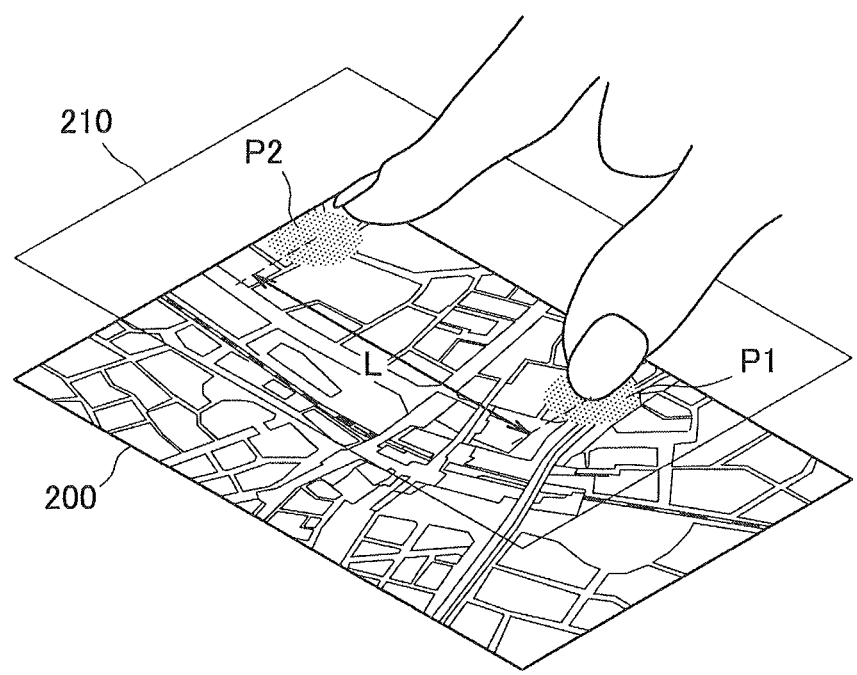
HOVERING FINGERS: TWO, SEPARATE
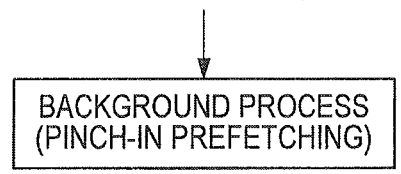

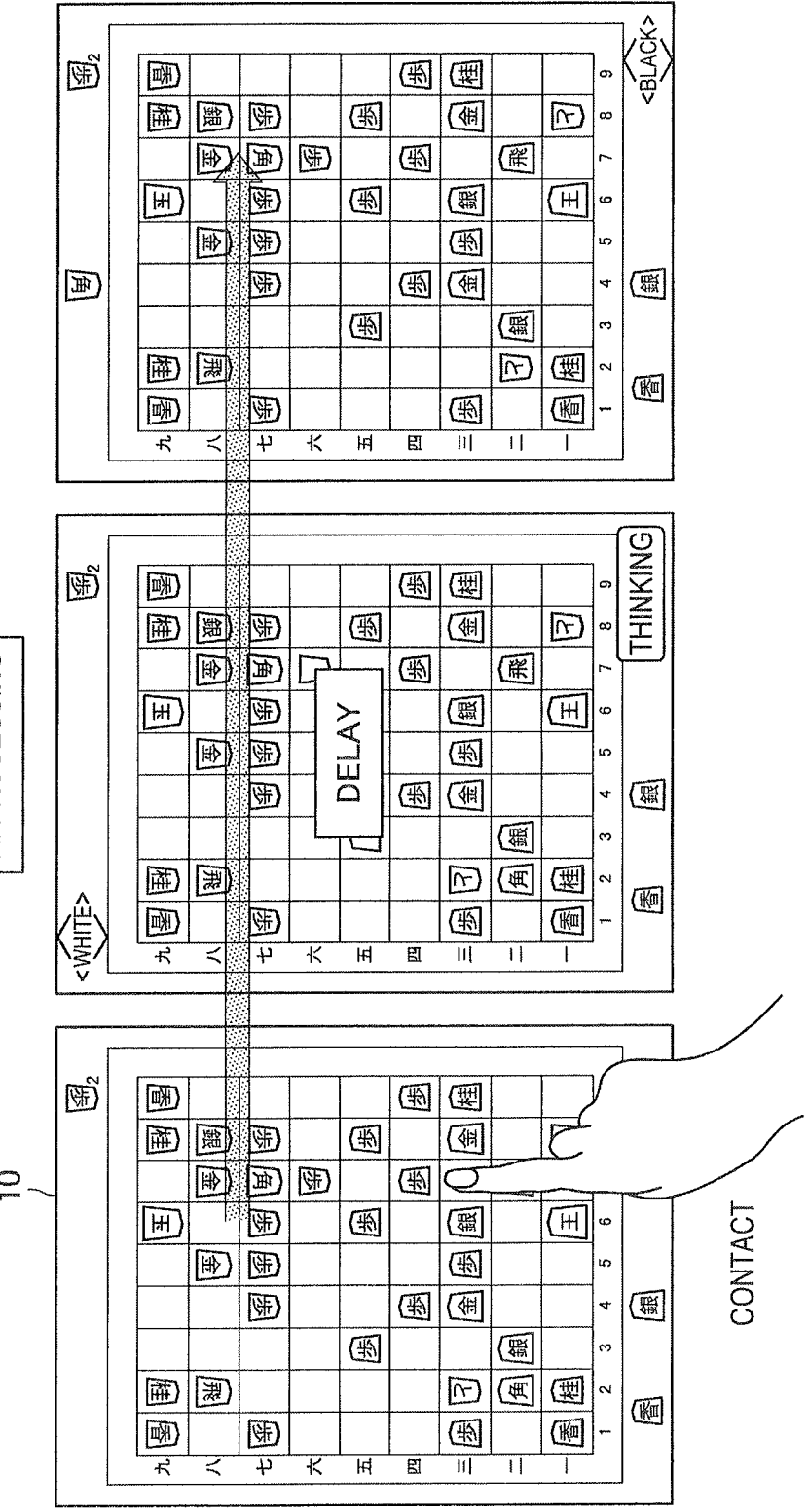

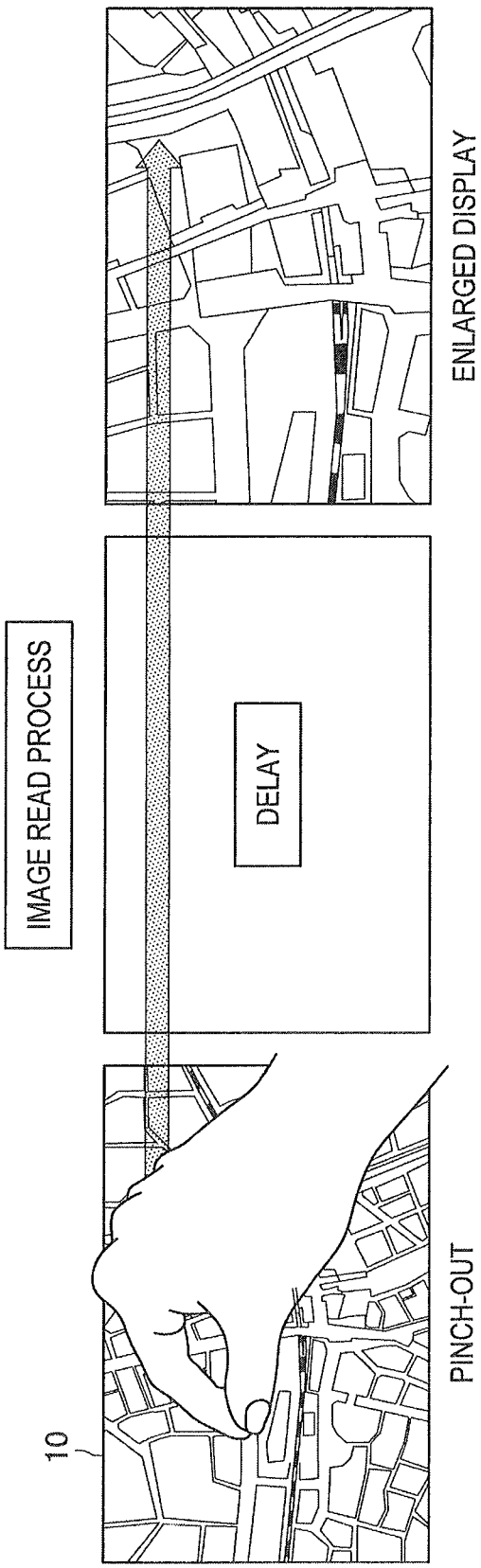

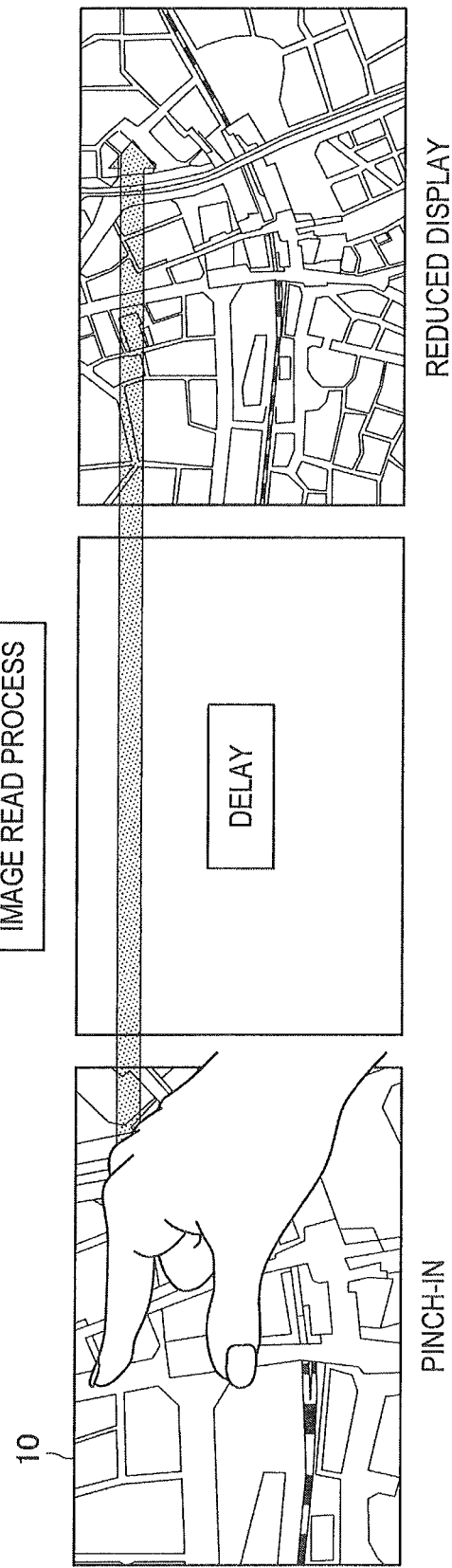

INFORMATION PROCESSING APPARATUS, INFORMATION PROCESSING METHOD, AND COMPUTER PROGRAM

BACKGROUND

The present disclosure relates to an information processing apparatus, an information processing method, and a computer program for causing a process according to an operation input to be performed.

Due to being able to realize a user interface (hereinafter, also referred to as a "UI") that was intuitive and easy to use, touch panels have been used for ticket-vending machines for public transportation, ATMs at banks, and the like. These days, touch panels have come to be able to detect actions of users, and to realize operation of appliances that were not attained by button operations in the past. Thus, these days, touch panels are being used more often in portable appliances such as mobile phones and game machines.

Furthermore, as indicated in JP 2008-117371A, a touch panel is proposed that not only detects contact of an operating tool, such as a finger or a touch pen, on a detection surface, but also detects proximity of the operating tool on the detection surface. Various operation inputs are thereby made realizable.

SUMMARY

However, when using a touch panel as an input unit with which an operation input is performed, preprocessing for performing a process corresponding to an operation input is started after the operation input is detected. Accordingly, one has to wait, after performing an operation input, for a processing time for the preprocessing until a process corresponding to the operation input is performed, and a delay may occur in GUI feedback to the user.

For example, as shown in FIG. 13, a case is considered where one compressed file is selected from a list 11 of compressed files, such as zip files, displayed on a display 10 and a process is performed to decompress the compressed file. When a finger contacts a decompression button 13 for starting decompression on a confirmation screen 12 used for confirming whether or not to decompress the compressed file that a user has selected from the list 11, preprocessing for decompressing the selected compressed file is started. Then, when the compressed file is decompressed, display processing of the decompressed file is started, and the contents of the file are displayed on the screen 10. At this time, since the decompression processing of the compressed file is performed after the operation input is detected, there is a slight delay until feedback is provided for the operation input.

Such a delay occurs, besides in decompression of compressed files, in file decompression in Samba, music/video decompression, a page-turning process of a pdf file, a decoding process of a piano software synthesizer, and the like. For example, with a decoding process of a piano software synthesizer, it is important that there is audio output feedback at the moment of operation input, and operability may be reduced by a delay by the preprocessing.

Furthermore, as shown in FIG. 14, for example, a case is considered where, in a computer strategy game such as Japanese chess, an operation input of a computer is processed using Artificial Intelligence. In this case, since a large amount of calculation processing has to be performed using AI processing to determine an operation input of a computer in response to an operation input of a user, there is a period in which the computer remains in a thinking state. Thus, a slight delay may occur until the thinking by the computer is complete, that is, the AI processing is complete, and the next operation input of the user is enabled.

A delay in processing is prone to occur also in a case feedback for an operation input of a user is provided over a network. For example, as shown in FIGS. 15 and 16, cases are considered where map information is acquired from a server that is connected to the screen 10 of a display device over a network. As shown in FIG. 15, in the case of enlarging display of map information displayed on the screen 10 by a pinch-out action of placing two fingers on the screen and widening the gap between the fingers, a process of acquiring enlarged map information from the server is started after the pinch-out action is detected. Thus, a slight delay may occur from detection of an operation input to a read process of the enlarged map information and to display of an image on the screen 10.

Likewise, as shown in FIG. 16, in the case of reducing display of map information displayed on the screen 10 by a pinch-in action of placing two fingers on the screen and narrowing the gap between the fingers, a process of acquiring reduced map information from the server is started after the pinch-in action is detected. Thus, a slight delay may occur from detection of an operation input to a read process of the reduced map information and to display of an image of the screen 10.

As such, with an application according to which there is a certain processing time until a user receives feedback for an operation input, such as a tap or a multi-touch gesture, after performing the operation input, it is desired that such a delay is prevented so as not to reduce operability.

According to the present disclosure, there is provided an information processing apparatus which includes an event processing unit for performing in a background a process corresponding to an operation input that is estimated based on a state of an operating tool in a first state, and for performing, when the operating tool in the first state enters a second state, a feedback process for the operation input using the process performed in the background.

Also, according to the present disclosure, there is provided an information processing method which includes performing in a background a process corresponding to an operation input that is estimated based on a state of an operating tool in a first state, and performing, when the operating tool in the first state enters a second state, a feedback process for the operation input using the process performed in the background.

Furthermore, according to the present disclosure, there is provided a computer program for causing a computer to function as an information processing apparatus including an event processing unit for performing in a background a process corresponding to an operation input that is estimated based on a state of an operating tool in a first state, and for performing, when the operating tool in the first state enters a second state, a feedback process for the operation input using the process performed in the background.

According to the present disclosure, by performing a process for an operation input that is estimated from the state of an operating tool in a first state, a feedback process can be performed without a delay when the operating tool enters a second state and the estimated operation input is performed.

As described above, according to the present disclosure, by estimating an operation input and performing, in the background, preprocessing for a process that is to occur, a slight delay until GUI feedback is provided can be prevented.

BRIEF DESCRIPTION OF THE DRAWINGS

FIG. 1 is an explanatory diagram showing a relationship between a process performed by an information processing apparatus according to a first embodiment of the present disclosure and an operation input;

FIG. 6 is an explanatory diagram describing a process that is estimated when two hovering fingers are adjacent to each other;

FIG. 7 is an explanatory diagram describing a process that is estimated when two hovering fingers are separate from each other;

FIG. 14 is an explanatory diagram describing a delay in feedback in AI processing;

FIG. 15 is an explanatory diagram describing a delay in feedback in a process over a network, and shows a case where a pinch-out action is performed; and FIG. 16 is an explanatory diagram describing a delay in feedback in a process over a network, and shows a case where a pinch-in action is performed.

DETAILED DESCRIPTION OF THE EMBODIMENT(S)

Figure 2:
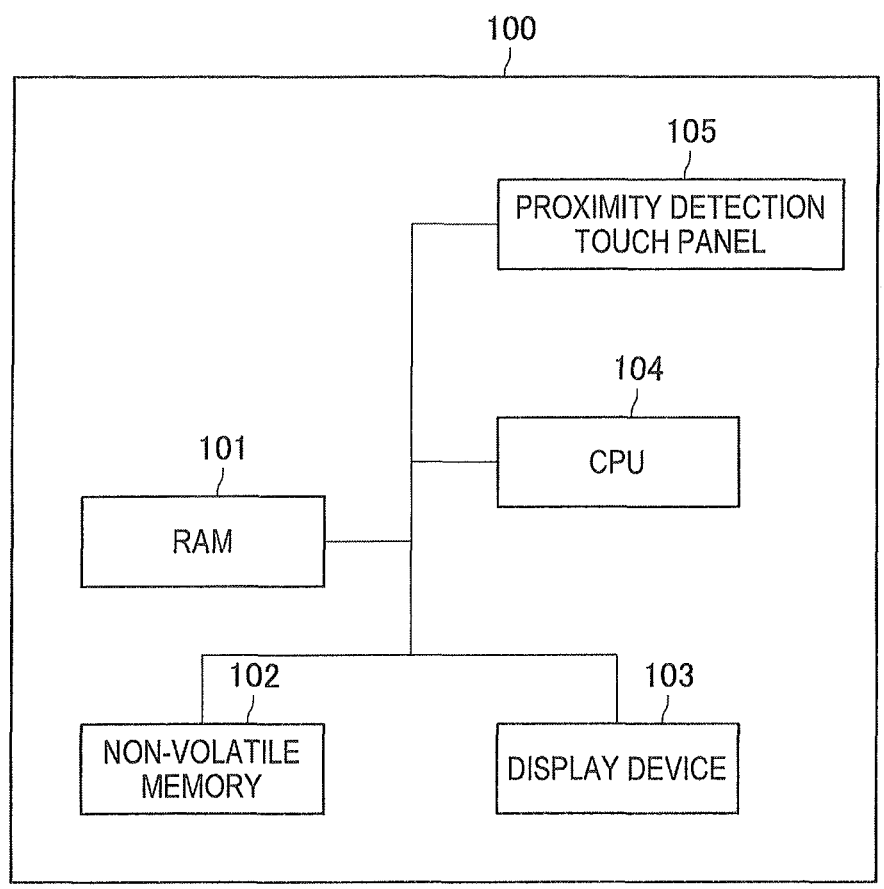
FIG. 2 is a hardware configuration diagram showing an example of a hardware configuration of the information processing apparatus according to the embodiment.

Hereinafter, preferred embodiments of the present disclosure will be described in detail with reference to the appended drawings. Note that, in this specification and the appended drawings, structural elements that have substantially the same function and configuration are denoted with the same reference numerals, and repeated explanation of these structural elements is omitted.

Additionally, an explanation will be given in the following order.

1. First Embodiment (Detection of Proximity and Contact of Operating Tool on Detection Surface)
 1.1. Overview of Process of Information Processing Apparatus
 1.2. Hardware Configuration
 1.3. Functional Configuration
 1.4. Feedback Process for Operation Input 2. Second Embodiment (Detection of Contact and Pressing of Operating Tool on Detection Surface)

1. First Embodiment

1.1. Overview of Process of Information Processing Apparatus

First, an overview of a process of an information processing apparatus according to a first embodiment of the present disclosure will be given with reference to FIG. 1. Additionally, FIG. 1 is an explanatory diagram showing a relationship between a process performed by the information processing apparatus according to the present embodiment and an operation input.

The information processing apparatus according to the present embodiment is a device that is connected with a display device, such as a touch panel, and that processes information transmitted from the display device. Such an information processing apparatus estimates an operation input of a user and performs, in the background, preprocessing for providing feedback for the estimated operation input so as to prevent a delay between reception of an operation input and provision of feedback for the operation input. As shown in FIG. 1, in the present embodiment, when a first state, that is, proximity of an operating tool, such as a finger or a touch pen, to a detection surface 200, is detected, the information processing apparatus acquires the state of the detected operating tool that is in proximity. Then, an operation input that a user is about to perform is estimated based on the state of the operating tool acquired, and preprocessing is performed, in the background, for providing feedback for the operation input which has been estimated.

Then, when a second state is detected, that is, when the operating tool contacted the display surface of the display device, the information processing apparatus provides GUI feedback based on a processing result of the preprocessing that was performed in the background. In this manner, by estimating an operation input of a user and performing preprocessing in the background in advance, time until the provision of GUI feedback can be shortened. In the following, a configuration of the information processing apparatus according to the present embodiment and its function will be described in detail.

1.2. Hardware Configuration

First, a hardware configuration of an information processing apparatus 100 according to the first embodiment of the present disclosure will be described with reference to FIG. 2. Additionally, FIG. 2 is a hardware configuration diagram showing an example of a hardware configuration of the information processing apparatus 100 according to the present embodiment.

As shown in FIG. 2, the information processing apparatus 100 according to the present embodiment includes a RAM (Random Access Memory) 101, a non-volatile memory 102, a display device 103, a CPU 104, and a proximity detection touch panel 105.

The RAM 101 temporarily stores programs used in the execution of the CPU 104, parameters arbitrarily changed in the execution of the programs, or the like. These elements are connected to each other by a host bus configured from a CPU bus or the like. The non-volatile memory 102 stores programs, arithmetic parameters or the like to be used by the CPU 104. As the non-volatile memory 102, a ROM (Read Only Memory), a flash memory or the like may be used, for example.

The display device 103 is an example of an output device that outputs information. As the display device 103, a liquid crystal display (LCD) device, an organic light emitting diode (OLED) device or the like may be used, for example. In the present embodiment, the display device 103 does not necessarily have to be provided in the information processing apparatus 100, and may be provided as an external appliance connected to the information processing apparatus 100 so as to be able to transmit/receive information.

The CPU 104 functions as an arithmetic processing unit and a control unit, and controls entire operation within the information processing apparatus 100 according to various programs. Moreover, the CPU 104 may also be a microprocessor. The proximity detection touch panel 105 is provided, being stacked on the display surface of the display device, and detects proximity and contact of an operating tool, such as a finger, by sensing an electrical signal by static electricity, for example.

1.3. Functional Configuration

Figure 3:
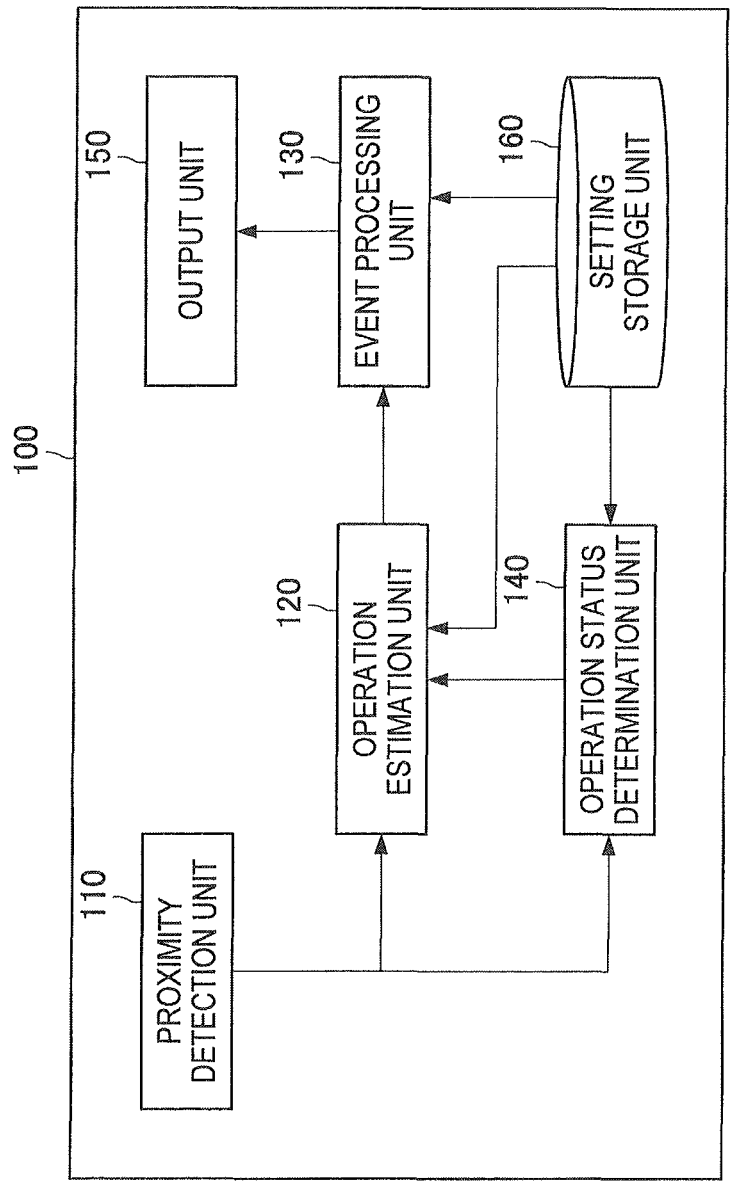
FIG. 3 is a functional block diagram of a functional configuration of the information processing apparatus according to the embodiment.

Next, a functional configuration of the information processing apparatus 100 according to the present embodiment will be described based on FIG. 3. Additionally, FIG. 3 is a functional block diagram showing a function configuration of the information processing apparatus 100 according to the present embodiment. FIG. 3 illustrates functional units necessary to perform a process up to provision of GUI feedback for an operation input of a user, and the information processing apparatus 100 according to the present embodiment may also include other functional units.

As shown in FIG. 3, the information processing apparatus 100 according to the present embodiment includes a proximity detection unit 110, an operation estimation unit 120, an event processing unit 130, an operation status determination unit 140, an output unit 150, and a setting storage unit 160.

The proximity detection unit 110 is a detection unit for detecting proximity and contact of an operating tool on a detection surface, and corresponds to the proximity detection touch panel 105 in FIG. 2. The detection surface of the proximity detection unit 110 may be provided on the display surface of a display device or on the surface of the housing of a device, for example. In the case of providing the detection surface on the display surface of a display device, a GUI can be provided which creates a feeling of as if directly operating, by an operating tool, information that is displayed to a user, and thus intuitive operation input is enabled.

When an operating tool comes closer to the detection surface than a proximity detection position 210 that is vertically above and separate by a predetermined distance h from the detection surface 200, the proximity detection unit 110 can detect the position of the operating tool with respect to the detection surface 200. Furthermore, the proximity detection unit 110 can also detect contact of the operating tool on the detection surface 200. Although it depends on the detection method of the proximity detection unit 110, the proximity state and the contact state can be detected based on the size of an electrical signal when using a detection method of sensing an electrical signal by static electricity, for example. A detection result of the proximity detection unit 110 (for example, an electrical signal by static electricity) is output to the operation estimation unit 120 and the operation status determination unit 140 at a predetermined interval, such as every time a detection value is acquired.

The operation estimation unit 120 determines whether or not an operating tool is in proximity of the detection surface, based on a detection result of the proximity detection unit 110. Also, in the case an operating tool is determined, by the result of determination, to be in proximity of the detection surface, the operation estimation unit 120 estimates an operation input which will possibly be performed based on the state of the operating tool that is in the proximity state. The correspondence relationship between the state of an operating tool and an operation input is stored in advance in the setting storage unit 160, for example, and the operation estimation unit 120 can estimate an operation input using this correspondence relationship. The operation estimation unit 120 outputs the estimated operation input to the event processing unit 130.

Furthermore, the operation estimation unit 120 determines, based on an operation status of the operating tool input from the operation status determination unit 140 described later, the possibility of an operation input which has already been estimated being performed. At this time, if it is determined that the possibility of an operation input which has already been estimated being performed is low, the operation estimation unit 120 outputs an instruction, to the event processing unit 130, for cancelling preprocessing for feedback that is being performed.

The event processing unit 130 performs, in the background, preprocessing necessary for providing feedback corresponding to the operation input estimated by the operation estimation unit 120, before the operation input is actually performed. Feedback for an operation input is stored in advance in the setting storage unit 160, for example, and the event processing unit 130 refers to the setting storage unit 160 and recognizes corresponding feedback based on the estimated operation input. Then, a process for providing the feedback is performed in the background.

Furthermore, when the estimated operation input is actually performed, the event processing unit 130 provides feedback using the preprocessing which has been performed in the background. A slight delay occurring between the operation input of a user and provision of feedback can thereby be prevented. The event processing unit 130 outputs to the output unit 150 the feedback for the operation input.

The operation status determination unit 140 determines the operation status by the operating tool detected by the proximity detection unit 110, based on the detection result of the proximity detection unit 110, and outputs the determination result to the operation estimation unit 120. As described above, the operation estimation unit 120 determines, based on the operation status by the operating tool input by the operation status determination unit 140, the possibility of the operation input which has already been estimated being performed. Like the operation estimation unit 120, the operation status determination unit 140 is also capable of estimating an operation input using the correspondence relationship between the state of an operating tool and an operation input stored in the setting storage unit 160.

The operation estimation unit 120, the event processing unit 130, and the operation status determination unit 140 can be realized by the CPU 104 in FIG. 2, for example.

The output unit 150 is an interface for outputting feedback from the event processing unit 130. The output unit 150 may be a display device or an audio output device such as a speaker that directly provides feedback to a user, for example, or may be an information transmission/reception unit connected to an external display device or the audio output device and the information processing apparatus 100.

The setting storage unit 160 is a storage unit storing various types of information necessary for performing a process up to provision of GUI feedback for an operation input of a user, and corresponds to the RAM 101 or the non-volatile memory 102 in FIG. 2, for example. Information to be stored in the setting storage unit 160 may be the correspondence relationship between the state of an operating tool and an operation input, the relationship between an operation input and its feedback, and the like, for example. These pieces of information may be stored in advance as the initial setting of the information processing apparatus 100, or may be set by a user.

1.4. Feedback Process for Operation Input

As described above, when the first state, that is, proximity of an operating tool to the display surface of a display device, is detected, the information processing apparatus 100 according to the present embodiment acquires the state of the detected operating tool which is at a proximity position. Then, an operation input that a user is about to perform is estimated based on the state of the operating tool which has been acquired, and preprocessing for providing feedback to the estimated operation input is performed in the background. Then, when the second state is detected, that is, when the operating tool contacts the display surface of the display device, the information processing apparatus provides GUI feedback based on a processing result of the preprocessing that was performed in the background. In this manner, by estimating an operation input of a user and performing preprocessing in the background in advance, time until the provision of GUI feedback is shortened.

Figure 4:
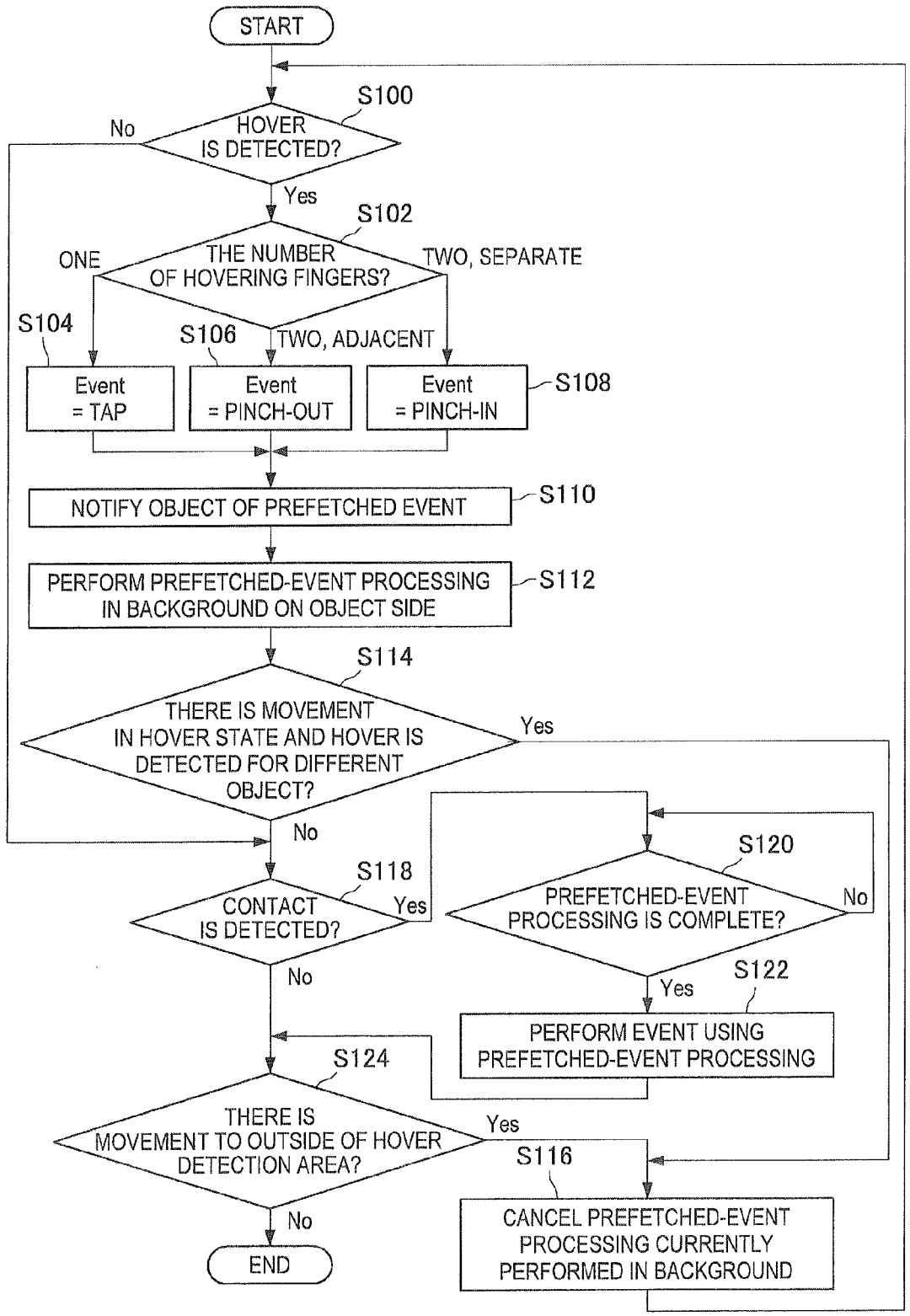
FIG. 4 is a flow chart showing a process, of the information processing apparatus according to the embodiment, up to providing feedback for an operation input.
Figure 5:
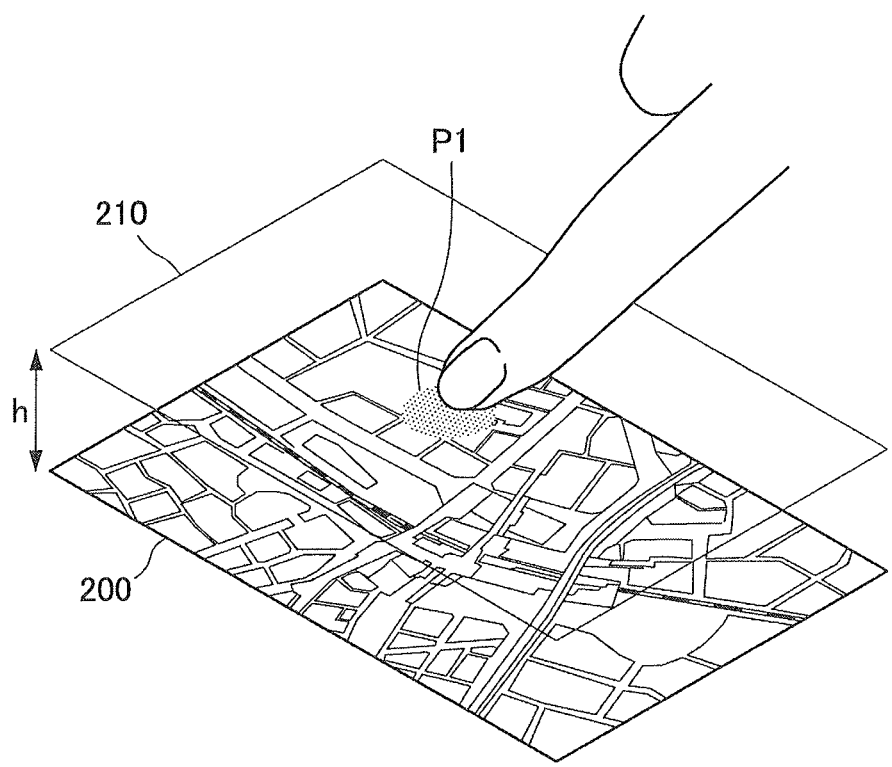
FIG. 5 is an explanatory diagram describing a process that is estimated when there is one hovering finger.
Figure 8:
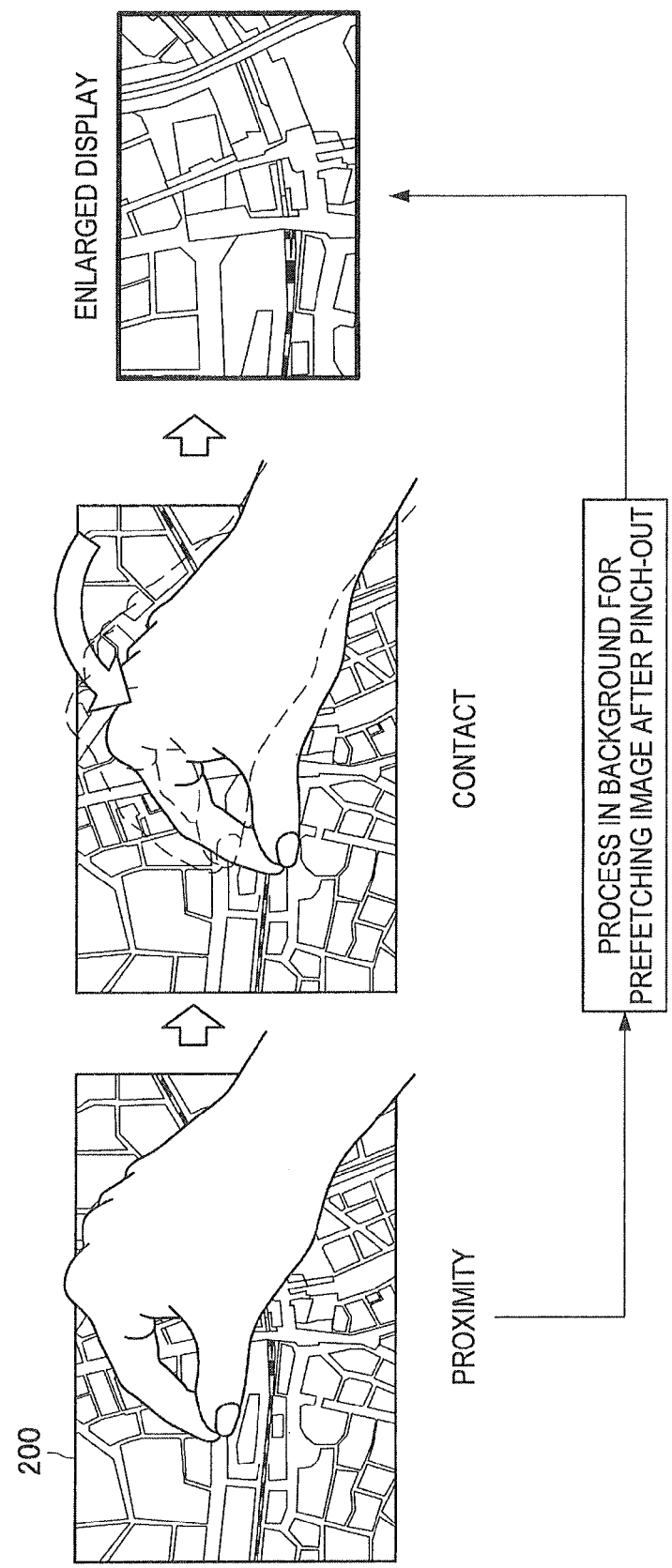
FIG. 8 is an explanatory diagram describing processing contents up to feedback where a pinch-out is estimated.
Figure 9:
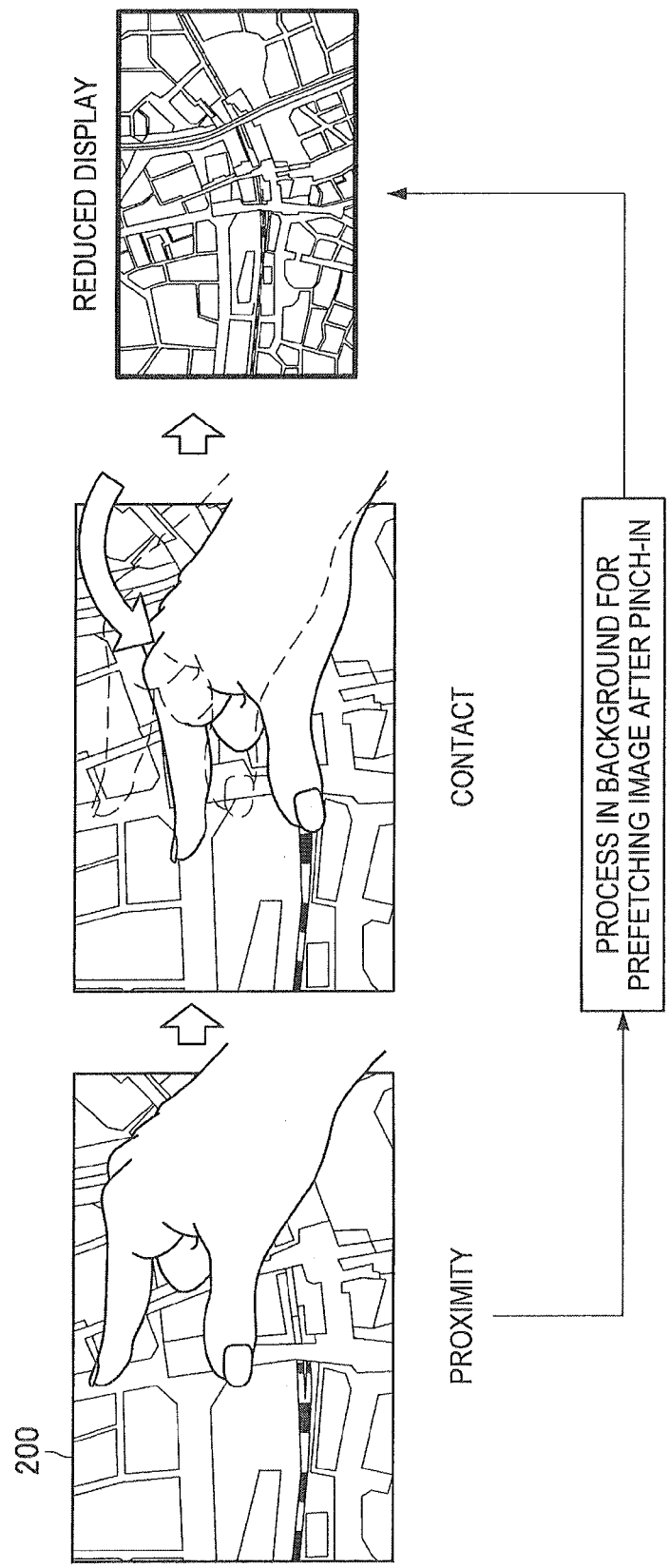
FIG. 9 is an explanatory diagram describing processing contents up to feedback where a pinch-in is estimated.

In the following, processing contents, of the information processing apparatus 100 according to the present embodiment, up to provision of feedback to an operation input will be described based on FIGS. 4 to 9. FIG. 4 is a flow chart showing a process, of the information processing apparatus 100 according to the present embodiment, up to providing feedback for an operation input. FIG. 5 is an explanatory diagram describing a process that is estimated when there is one hovering finger. FIG. 6 is an explanatory diagram describing a process that is estimated when two hovering fingers are adjacent to each other. FIG. 7 is an explanatory diagram describing a process that is estimated when two hovering fingers are separate from each other. FIG. 8 is an explanatory diagram describing processing contents up to feedback where a pinch-out is estimated. FIG. 9 is an explanatory diagram describing processing contents up to feedback where a pinch-in is estimated.

Here, a case where an application related to display of map information that can be acquired from a server connected over a network is run will be described as an example. Moreover, the operating tool is assumed to be a finger.

First, the operation estimation unit 120 of the information processing apparatus 100 detects, based on a detection result of the proximity detection unit 110, whether there is a finger, which is an operating tool, above the detection surface (S100: hover detection). The proximity detection unit 110 can detect the position of a finger with respect to the detection surface when the finger comes closer to the detection surface than a proximity detection position 210 that is vertically above and separate by a predetermined distance h from the detection surface 200. Then, when it is determined based on a detection result of the proximity detection unit 110 that there is a finger not in contact with the detection surface but closer to the detection surface than the proximity detection position 210, that is, when it is determined that there is a hovering finger, the operation estimation unit 120 performs the processing of step S102.

In step S102, the operation estimation unit 120 determines, based on the detection result of the proximity detection unit 110, the number of hovering fingers and their states. Whether a finger is in contact with the detection surface and the position of a detected finger with respect to the detection surface can be recognized based on the result of the proximity detection unit 110. The operation estimation unit 120 can thereby recognize the number of fingers detected and the states of the detected fingers. The operation estimation unit 120 estimates an operation input that the user is about to perform, by recognizing hovering finger(s) and the number thereof.

In the present example, as the operation inputs that a user performs when map information acquired from a server is displayed, there are a tap, a pinch-out, a pinch-in, and the like, for example. As shown in FIG. 5, for example, in the case only one point, P1, is detected within a proximity region (a spatial region between the detection surface and the proximity detection position 210 that is vertically above and separate by a predetermined distance h from the detection surface), it can be estimated that there is only one hovering finger. In this case, it can be assumed that an action of tapping map information with one finger is about to be performed. Also, as shown in FIG. 6, for example, in the case two points, P1 and P2, are detected within the proximity region and a distance L between the two points P1 and P2 is smaller than a predetermined distance Ls, it can be estimated that two fingers are hovering and that these fingers are adjacent to each other. In this case, it can be assumed that an action of pinching out the map information with two fingers is about to be performed.

Furthermore, as shown in FIG. 7, for example, in the case two points, P1 and P2, are detected within the proximity region and the distance L between the two points P1 and P2 is the predetermined distance Ls or greater, it can be estimated that two fingers are hovering and that these fingers are separate from each other. In this case, it can be assumed that an action of pinching in the map information with two fingers is about to be performed. Such correspondence relationships between the states of fingers and the operation inputs are stored in the setting storage unit 160 in advance, and the operation estimation unit 120 can estimate an operation input that a user is about to perform by referring to the setting storage unit 160 based on the detection result of the proximity detection unit 110. Additionally, the predetermined distance Ls may be set based on the distance between fingers at the first time of the user performing the pinch-out action or the pinch-in action in the past, for example.

In the present example, in the case it is recognized in step S102 that the number of hovering fingers is one, the operation estimation unit 120 estimates that the operation input (Event) that the user is about to perform is a tap (S104). Also, in the case it is recognized in step S102 that the number of hovering fingers is two and that they are adjacent to each other, the operation estimation unit 120 estimates that the operation input that the user is about to perform is a pinch-out (S106). Furthermore, in the case it is recognized in step S102 that the number of hovering fingers is two and that they are separate from each other, the operation estimation unit 120 estimates that the operation input that the user is about to perform is a pinch-in (S108). The operation input estimated in step S104, S106, or S108 is output from the operation estimation unit 120 to the event processing unit 130 (S110).

The event processing unit 130 which has been notified by the operation estimation unit 120 of the estimated operation input performs a prefetched-event processing in the background on the object side (S112). In step S112, the event processing unit 130 performs in advance processing of feedback that is to be provided in a case the estimated operation input is carried out, before the operation input is actually performed. For example, in the case it is estimated by the operation estimation unit 120 that a tap will be performed, the event processing unit 130 acquires from the setting storage unit 160 contents of processing of feedback that is based on the tap action according to the map information display application. For example, in the case the address or area information of a location that is displayed at the tapped position is to be displayed by the tap action, the event processing unit 130 performs in the background a process for acquiring the address or area information of the location from a server.

Furthermore, for example, in the case it is estimated by the operation estimation unit 120 that a pinch-out will be performed, the event processing unit 130 acquires from the setting storage unit 160 contents of processing of feedback that is based on the pinch-out action according to the map information display application. For example, in the case a part displayed at a position contacted by fingers is to be enlarged and displayed by the pinch-out action, the event processing unit 130 estimates that the positions the fingers are in proximity of are the positions that the fingers will contact, and performs in the background a process for acquiring from a server map information, as shown in FIG. 8, showing the part displayed at the position in an enlarged manner.

Moreover, for example, in the case it is estimated by the operation estimation unit 120 that a pinch-in will be performed, the event processing unit 130 acquires from the setting storage unit 160 contents of processing of feedback that is based on the pinch-in action according to the map information display application. For example, in the case a part displayed at a position contacted by fingers is to be reduced and displayed by the pinch-in action, the event processing unit 130 estimates that the positions the fingers are in proximity of are the positions that the fingers will contact, and performs in the background a process for acquiring from a server map information, as shown in FIG. 9, showing the part displayed at the position in a reduced manner.

In this manner, in step S112, a process that is to be performed when an operation input is performed is performed in the background based on the estimated operation input. On the other hand, the operation status determination unit 140 monitors, based on a detection result of the proximity detection unit 110, a change in the state of a finger that is currently detected (S114). In the present example, the operation status determination unit 140 acquires the position of a finger that is in a hovering state, and determines whether there is a movement of the finger and whether the finger that is currently detected is at a position corresponding to a different object. Whether the process to be performed in the background according to the position of the currently detected finger will change or not can thereby be identified.

It is assumed that the operation status determination unit 140 has determined that the finger detected in step S114 is moving in a hovering state and is at a position corresponding to a different object. In this case, the operation estimation unit 120 outputs to the event processing unit 130 an instruction for cancelling the process that is currently being performed in the background (S116). The event processing unit 130 cancels the processing that is being performed in the background, and then, the information processing apparatus 100 starts again from the processing of step S100.

Alternatively, it is assumed that the operation status determination unit 140 has determined that the finger detected in step S114 is not in a state of moving in a hovering state and of existing at a position corresponding to a different object. In this case, the processing in the background that was started in step S112 is continued. Then, when the operation status determination unit 140 determines, based on a detection result of the proximity detection unit 110, that the hovering finger comes in contact, the operation estimation unit 120 instructs the event processing unit 130 to perform processing of the feedback for the estimated operation input.

The event processing unit 130, which has received the instruction, first determines whether the prefetched-event processing in the background is complete (S120), and if it is not complete, continues the process in the background. Then, when the process in the background is complete, the event processing unit 130 provides feedback to the operation input by using the prefetched-event processing which was performed in the background (S122). In this manner, by performing a process in the background in advance, feedback for an actual operation input can be provided without a delay.

Additionally, the processing of steps S118 to S122 is performed in the same manner also when it is determined in step S100 that there is no hover detection. For example, in the case there is no hovering finger and contact on the detection surface is detected, an operation input at the time of contact is determined, and a process for providing corresponding feedback is performed.

When there is no contact detection in step S118, or when feedback for an operation input is provided in step S122, the operation status determination unit 140 determines whether the hovering finger has moved to a region where detection by the proximity detection unit 110 is not possible (to the outside of a hover detection area) (S124). In the case it is determined in step S124 that the hovering finger has not moved to the outside of the hover detection area, the information processing apparatus 100 ends the process shown in FIG. 4, and performs the process again from step S100. On the other hand, in the case it is determined in step S124 that the hovering finger has moved to the outside of the hover detection area, the operation estimation unit 120 outputs, to the event processing unit 130, an instruction for cancelling the process that is currently being performed in the background (S116). The event processing unit 130 cancels the process that is being performed in the background, and then, the information processing apparatus 100 starts again from the process of step S100.

In the foregoing, the information processing apparatus 100 according to the first embodiment of the present disclosure and its feedback process for an operation input have been described. According to the present embodiment, based on a detection result of the proximity detection unit 110, the state of a finger that is in a proximity state is recognized, and an operation input is estimated. Then, preprocessing for providing feedback corresponding to the estimated operation input is performed in the background. Then, when the estimated operation input is performed, feedback is provided using the process that was performed in the background. A slight delay between an operation input by a user and provision of feedback corresponding to the operation input can thereby be prevented.

Although a method of preventing a slight delay occurring when acquiring map information from a server connected over a network has been described with reference to FIGS. 4 to 9, a delay occurring when decompressing a compressed file or a delay occurring when performing AI processing can also be prevented by the process shown in FIG. 4.

Figure 10:
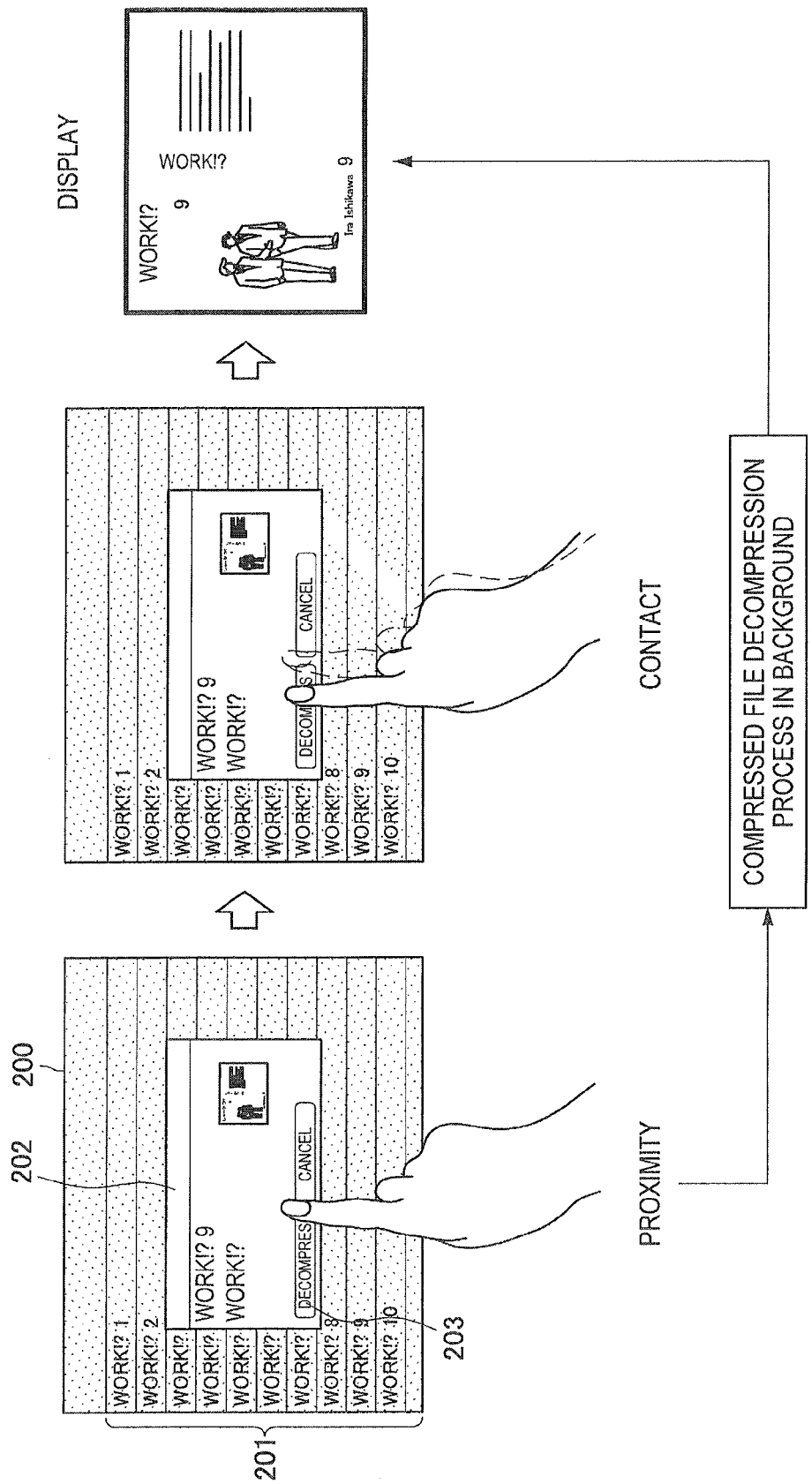
FIG. 10 is an explanatory diagram describing feedback in a decompression process of a compressed file according to the embodiment.

For example, a case is considered, as shown in FIG. 10, of performing a process of selecting and decompressing one compressed file in a list 201 of compressed files, such as zip files, displayed on a screen 200. When proximity of a finger to a decompression button 201 for starting decompression is detected on a confirmation screen 202 used for confirming whether or not to decompress a compressed file selected by a user from the list 201, preprocessing for decompressing the selected compressed file is started in the background. Then, when the finger actually touches the decompression button 203, the information processing apparatus 100 starts a display process of a file decompressed in the background, and the contents of the file are displayed on the screen 200.

In this manner, by performing a decompression process of a compressed file in the background when a finger comes into proximity of the decompression button 203, a slight delay between contacting of the finger on the decompression button 203 and display of contents of a file on the screen 200 can be prevented.

Figure 11:
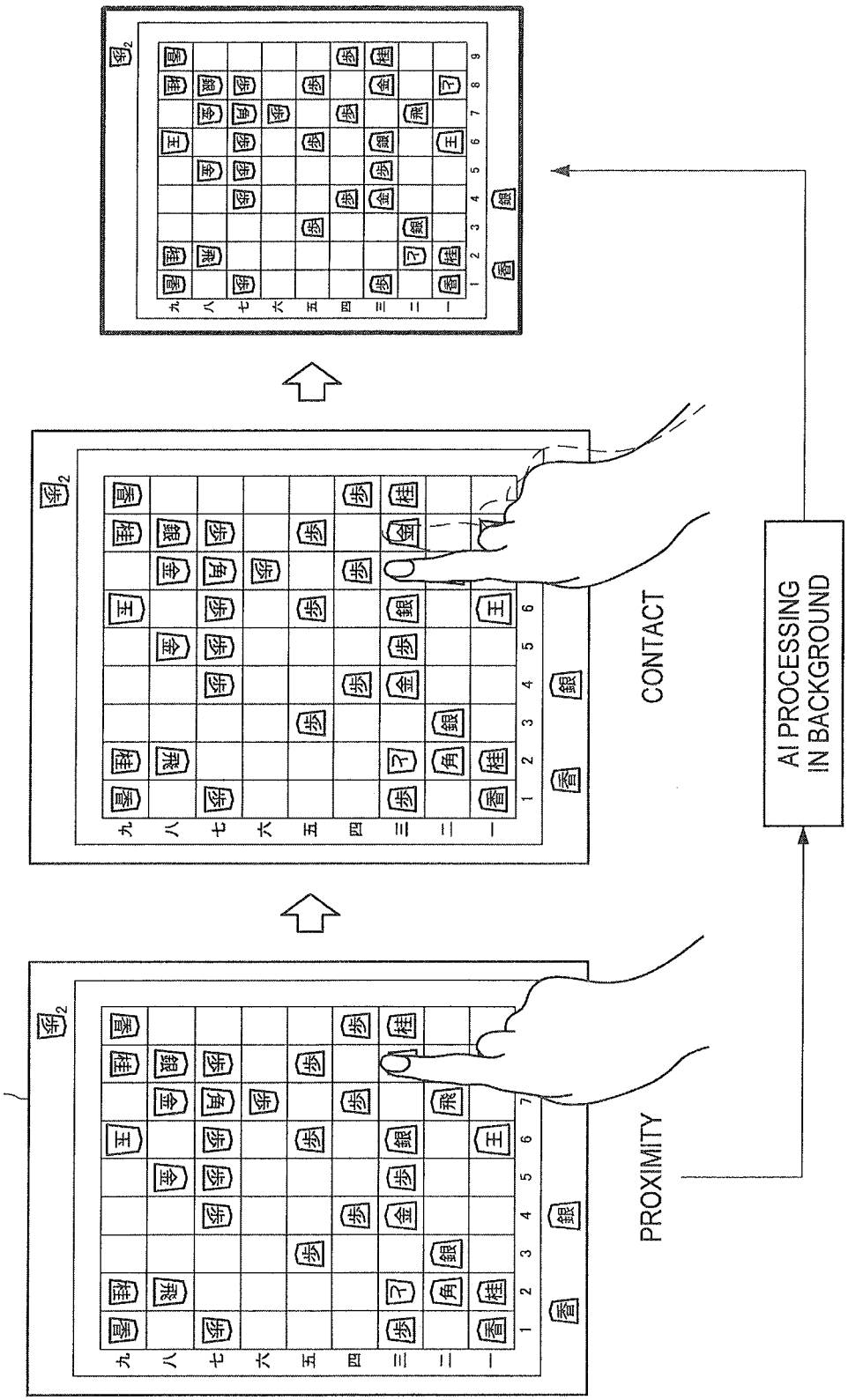
FIG. 11 is an explanatory diagram describing feedback in AI processing according to the embodiment.

Furthermore, for example, as shown in FIG. 11, in the case of performing AI processing of an operation input of a computer in a computer strategy game, such as Japanese chess, the information processing apparatus 100 estimates that a process for a case of selecting an object corresponding to a position of a finger that is in proximity of the detection surface is to be performed. When an operation input is estimated, the event processing unit 130 performs in the background a process that is performed when the estimated operation input is performed.

Here, the user may, while thinking about the next operation input, move the finger in a hovering state according to what he/she is thinking. When the object corresponding to the position of the finger is changed by the finger in the hovering state moving, the estimated operation input also changes. In this case, the operation estimation unit 120 cancels the process that is being performed in the background, and performs in the background a process which will be performed when a newly estimated operation input is performed. In this manner, the operation status is monitored, and preprocessing for providing feedback for an operation input that is highly likely to be performed is performed in the background. When the operation input is actually performed, the information processing apparatus 100 provides feedback using the process performed in the background. The thinking time of the computer can thereby be shortened, and a slight delay occurring until the next operation input of the user is enabled can be prevented.

Furthermore, the information processing apparatus 100 according to the present embodiment decides, based on the state of a finger in the proximity state (the number of fingers, the proximity position, or the like), the target to be taken into consideration when performing a process in the background. Here, the information processing apparatus 100 may widen the target range of the process that is to be performed in the background as the number of hovering fingers increases, for example. Or, the target range of the process that is to be performed in the background may be widened according to the range of movement of the hovering finger. The process to be performed in the background can thereby be adjusted, and the possibility of a delay occurring in the process can be reduced.

For example, in the example shown in FIG. 11, the target range of a process that is to be performed in the background is widened according to the range of movement of the finger in a hovering state that is in accordance with the thinking of the user. By performing in the background preprocessing for each of processes that are to be performed when objects included in the range of movement of the finger are operated, feedback can be provided without a delay for any of a plurality of possible operation inputs.

Furthermore, the information processing apparatus 100 may preferentially perform, in the background, a process that is to be performed when a finger contacts a position at which a finger is closest to the detection surface, according to the status of the finger. For example, it is assumed that proximity of a plurality of fingers has been detected in the example shown in FIG. 11. In this case, if preprocessing is performed for all the operation inputs estimated based on the positions of the respective fingers, heavy load may be placed on the information processing apparatus 100. Thus, in the case proximity of a plurality of fingers is detected, a process that is to be performed when a finger contacts a position at which a finger is closest to the detection surface is decided to be the process that is most likely to be performed, and is preferentially performed in the background. The load on the information processing apparatus 100 can thereby be reduced.

Furthermore, with the information processing apparatus 100 according to the present embodiment, the operation estimation unit 120 may estimate a plurality of operation inputs which may be performed by a user, based on a detection result of the proximity detection unit 110. In this case, the operation estimation unit 120 may notify the event processing unit 130 of an operation input for which the execution priority is the highest among the estimated operation inputs. The execution priority is set to specify an operation input that is most likely to be performed. The execution priority can be set based on the number of fingers that are in proximity of the detection surface, or, if a plurality of fingers are detected, the positional relationship thereof, for example. Or, the execution priority may be set in advance, highest from the processing contents desired to be preferentially performed. By setting the execution priority in this manner, an estimated operation input may be uniquely determined.

Additionally, the centre position of a plurality of fingers detected to be in proximity, and not the position of a finger that is closest to the detection surface, may be taken as the position that is most likely to be contacted by the fingers.

2. Second Embodiment

Next, an overview of a process of an information processing apparatus according to a second embodiment of the present disclosure will be given with reference to FIG. 12. Additionally, FIG. 12 is an explanatory diagram showing a relationship between a process performed by an information processing apparatus according to the present embodiment and an operation input.

As in the first embodiment, the information processing apparatus according to the present embodiment is a device that is connected to a display device, such as a touch panel, and that processes information transmitted from the display device. To prevent a delay between reception of an operation input and provision of feedback for the operation input, such an information processing apparatus estimates an operation input of a user and performs, in the background, preprocessing for providing feedback to the estimated operation input.

Figure 12:
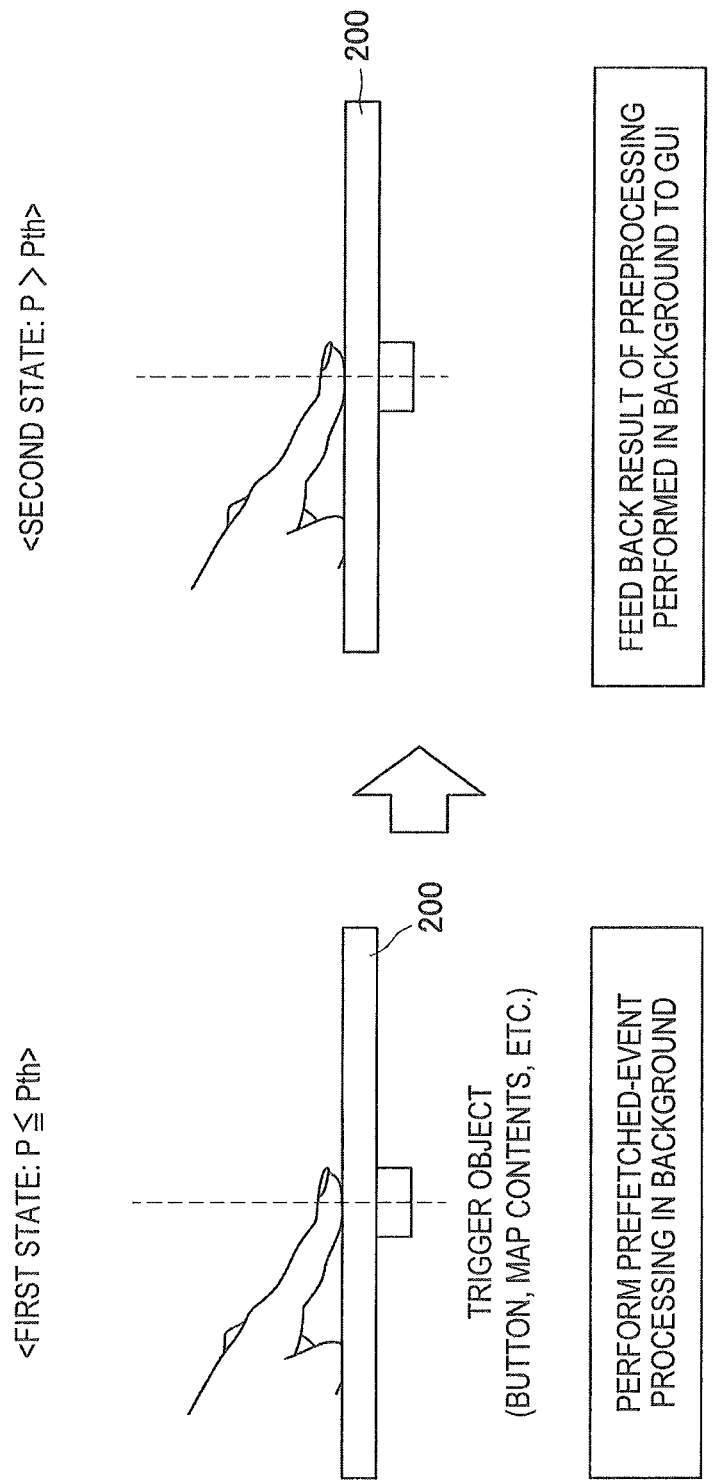
FIG. 12 is an explanatory diagram showing a relationship between a process performed by an information processing apparatus according to a second embodiment of the present disclosure and an operation input.
Figure 13:
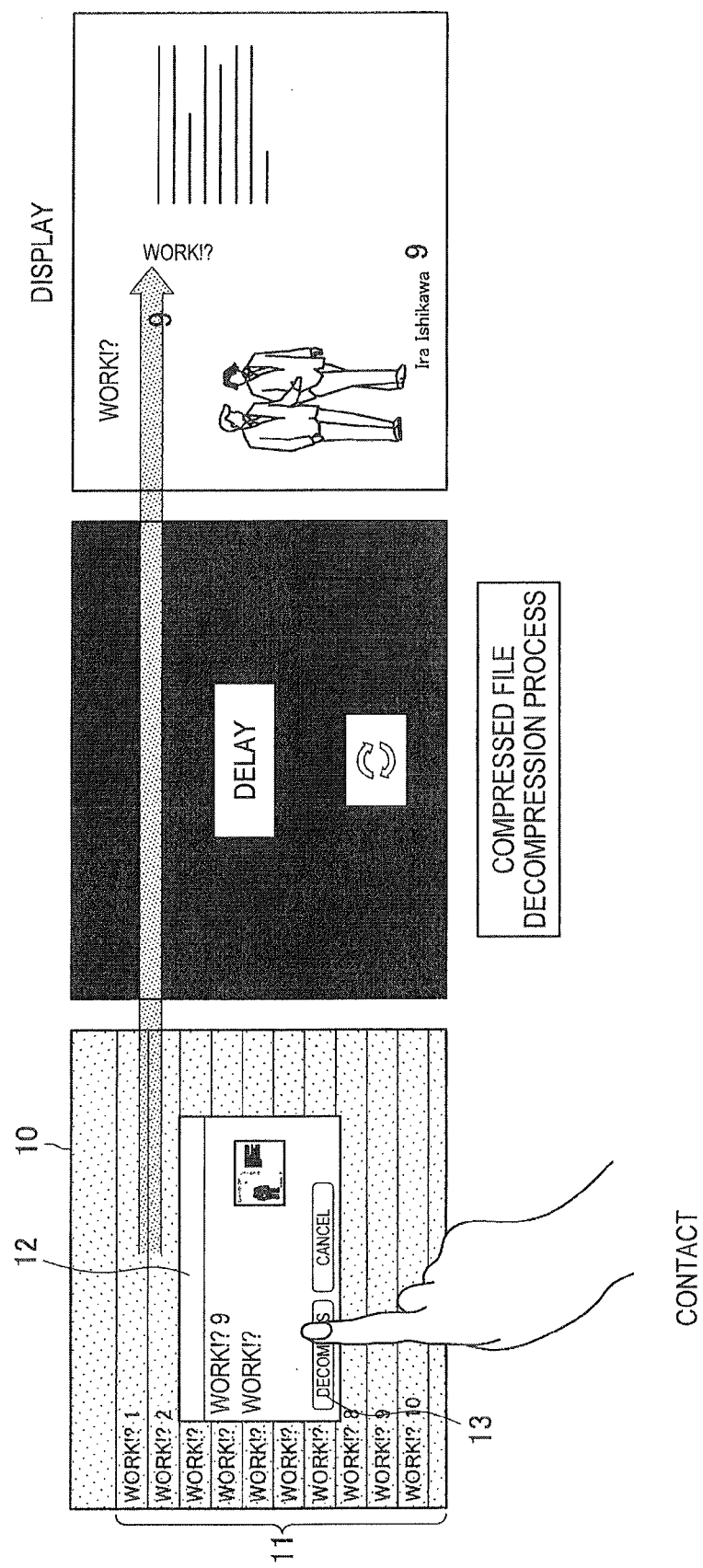
FIG. 13 is an explanatory diagram describing a delay in feedback in a decompression process of a compressed file.

As shown in FIG. 12, when a first state, that is, contact of an operating tool, such as a finger or a touch pen, on a detection surface 200, is detected, the information processing apparatus according to the present embodiment acquires the state of the detected operating tool that is at the contact position. Then, based on the state of the operating tool acquired, an operation input that is about to be performed by the user is estimated, and preprocessing for providing feedback for the estimated operation input is performed in the background.

Then, when a second state is detected, that is, when the operating tool placed pressure that is higher than predetermined pressure Pth on the display surface of the display device, the information processing apparatus provides GUI feedback based on the processing result of the preprocessing that was performed in the background. In this manner, by estimating an operation input of a user and performing preprocessing in the background in advance, time until the provision of GUI feedback can be shortened.

The information processing apparatus according to the present embodiment can be configured in the same way as the information processing apparatus 100 according to the first embodiment. However, the information processing apparatus according to the present embodiment uses, instead of the proximity detection touch panel 105 of FIG. 2, a pressure-sensitive touch panel that senses a change in the pressure on a display surface and detects contact of a finger. The first state, which is a trigger for performing a process in the background, and the second state, which is a trigger for actually starting feedback, can thereby be distinguished. Other configurations and functions are the same as those of the first embodiment.

It should be understood by those skilled in the art that various modifications, combinations, sub-combinations and alterations may occur depending on design requirements and other factors insofar as they are within the scope of the appended claims or the equivalents thereof.

For example, in the above embodiments, an information processing apparatus is applied to decompression of a compressed file, AI processing, information acquisition over a network, or the like, but the present technology is not limited to such examples. For example, by applying an information processing apparatus according to the above embodiments to acquisition process of a music piece from a music playback list or a video acquisition process, a slight processing delay can be prevented in the same manner.

Additionally, configurations as below are also within the technical scope of the present disclosure.

(1)

An information processing apparatus including:

an event processing unit for performing in a background a process corresponding to an operation input that is estimated based on a state of an operating tool in a first state, and for performing, when the operating tool in the first state enters a second state, a feedback process for the operation input using the process performed in the background.

(2)

The information processing apparatus according to (1), including:

a detection unit for detecting a state of the operating tool;

an operation estimation unit for estimating, based on a detection result of the detection unit, an operation input by the operating tool; and an operation status determination unit for determining, and notifying to the operation estimation unit, a change in a state of the operating tool that is in the first state, wherein, when the operating tool is determined based on the detection result of the detection unit to be in the first state, the operation estimation unit estimates, and notifies to the event processing unit, an operation input by the operating tool, and wherein, when the operation status determination unit determines based on the detection result of the detection unit that the operating tool entered the second state from the first state, the operation estimation unit notifies to the event processing unit an instruction for performing the feedback process for the operation input.

(3)

The information processing apparatus according to (2), wherein the operation estimation unit estimates the operation input based on at least one of the number and position of operating tools in the first state.

(4)

The information processing apparatus according to (2) or (3), wherein, when a plurality of operation inputs are estimated by the operation estimation unit, the event processing unit determines a process to be performed in the background based on an execution priority.

(5)

The information processing apparatus according to (4), wherein the execution priority is determined based on a status of the operating tool in the first state.

(6)

The information processing apparatus according to any one of (1) to (5), wherein the event processing unit determines a target to be taken into consideration when performing a process in the background, based on a status of the operating tool in the first state.

(7)

The information processing apparatus according to any one of (1) to (6), wherein the first state is a state in which the operating tool is in proximity of a detection surface, and the second state is a state in which the operating tool is in contact with the detection surface.

(8)

The information processing apparatus according to any one of (1) to (6), wherein the first state is a state in which the operating tool is in contact with a detection surface, and the second state is a state in which the operating tool is pressing the detection surface with a force higher than predetermined pressure.

The present application contains subject matter related to that disclosed in Japanese Priority Patent Application JP 2011-118573 filed in the Japan Patent Office on May 27, 2011, the entire content of which is hereby incorporated by reference.

What is claimed is:

1. An information processing apparatus comprising:
a detection unit for detecting a position and a state of at least one operating tool with respect to a detection surface;
an operation estimation unit for estimating, based on a detection result of the detection unit, an operation input process by the at least one operating tool;
an operation status determination unit for determining, and notifying to the operation estimation unit, whether there is a change in the state of the at least one operating tool while in proximity to the detection surface; and an event processing unit configured to
  perform in a background the estimated operation input process based on the detected position and the detected state of the at least one operating tool while in proximity to the detection surface without notifying the performance of the estimated operation input process to a user, and
  perform, when the at least one operating tool in proximity to the detection surface makes contact with the detection surface, a visual feedback process that is displayed to the user using the estimated operation input process previously performed in the background if the contact is within a predetermined threshold distance from the detected position and the operation status determination unit determines that the state of the at least one operating tool does not change from when the at least one operating tool was in proximity to the detection surface,
wherein the detection unit, the operation estimation unit, the operation status determination unit, and the event processing unit are each implemented via at least one processor.

2. The information processing apparatus according to claim 1, wherein the operation estimation unit estimates the operation input process based on the detected state of the at least one operating tool, wherein the state of the at least one operating tool includes a number of detected operating tools and a relative position of the at least one operating tool while in proximity to the detection surface.

3. The information processing apparatus according to claim 2, wherein the at least one operating tool comprises at least one finger of a user, and when the number of detected operating tools indicates a plurality of fingers, the detected state of the at least one operating tool is determined by the relative position of the plurality of fingers.

4. The information processing apparatus according to claim 3, wherein the relative position of the plurality of fingers comprises a distance between detected positions corresponding to each finger of the plurality of fingers.

5. The information processing apparatus according to claim 4, wherein the estimated input process is estimated to be a visual enlargement process when the distance between the detected positions is less than a predetermined amount, and the estimated input process is estimated to be a visual reduction process when the distance between the detected positions is greater than the predetermined amount.

6. The information processing apparatus according to claim 1, wherein, when a plurality of operation input processes are estimated by the operation estimation unit, the event processing unit determines a selected input process to be performed in the background based on an execution priority.

7. The information processing apparatus according to claim 6, wherein the execution priority is determined based on the determined status of each operating tool of the at least one operating tool while in proximity to the detection surface.

8. The information processing apparatus according to claim 1, wherein the event processing unit determines a target to be taken into consideration when performing a process in the background, based on the determined status of the at least one operating tool while in proximity to the detection surface.

9. The information processing apparatus according to claim 1, wherein the proximity of the at least one operating tool comprises low-pressure contact with the detection surface, the low-pressure contact having less than a predetermined amount of contact pressure, and the contact of the at least one operating tool is high-pressure contact with the detection surface, the high-pressure contact having more than the predetermined amount of contact pressure.

10. An information processing method, implemented via at least one processor, the method comprising:
  detecting a position and a state of at least one operating tool with respect to a detection surface;
  estimating, based on the detected position and the detected state of the at least one operating tool, an operation input process by the at least one operating tool;
  determining whether there is a change in the state of the at least one operating tool while in proximity to the detection surface;
  performing in a background the estimated operation input process based on the detected position and the detected state of the at least one operating tool while in proximity to the detection surface without notifying the performance of the estimated operation input process to a user; and
  performing, when the at least one operating tool in proximity to the detection surface makes contact with the detection surface, a visual feedback process that is displayed to the user using the estimated operation input process performed in the background if the contact is within a predetermined threshold distance from the detected position and the operation status determination unit determines that the state of the at least one operating tool does not change from when the at least one operating tool was in proximity to the detection surface.

11. A non-transitory computer-readable medium having embodied thereon a program, which when executed by a processor of an image processing apparatus causes the processor to perform a method, the method comprising:
  detecting a position and a state of at least one operating tool with respect to a detection surface;
  estimating, based on the detected position and the detected state of the at least one operating tool, an operation input process by the at least one operating tool;
  determining whether there is a change in the state of the at least one operating tool while in proximity to the detection surface;
  performing in a background the estimated operation input process based on the detected position and the detected state of the at least one operating tool while in proximity to the detection surface without notifying the performance of the estimated operation input process to a user, and
  performing, when the at least one operating tool in proximity to the detection surface makes contact with the detection surface, a visual feedback process that is displayed to the user using the estimated operation input process performed in the background if the contact is within a predetermined threshold distance from the detected position and the operation status determination unit determines that the state of the at least one operating tool does not change from when the at least one operating tool was in proximity to the detection surface.

* * * * *